(Model.)

N. W. SPEERS, Sr.
COMBINED FRICTION AND COG GEAR.

No. 294,819. Patented Mar. 11, 1884.

Attest:
Geo. T. Smallwood.
J. Henry Kaiser.

Inventor:
Noah W. Speers Sr.
By Knight Bros
attys.

UNITED STATES PATENT OFFICE.

NOAH W. SPEERS, SR., OF MEMPHIS, TENNESSEE, ASSIGNOR OF ONE-HALF TO WM. A. SMITH, OF SAME PLACE.

COMBINED FRICTION AND COG GEAR.

SPECIFICATION forming part of Letters Patent No. 294,819, dated March 11, 1884.

Application filed July 30, 1883. (Model.)

*To all whom it may concern:*

Be it known that I, NOAH W. SPEERS, Sr., a citizen of the United States, residing at Memphis, in the county of Shelby and State of Tennessee, have invented certain new and useful Improvements in Combined Friction-Gear and Cog-Wheels, of which the following is a specification.

My invention consists in forming upon the outer periphery of gear-wheels certain cogs and friction portions arranged and distributed in such a manner that the cogs will intermesh and the friction portions will bear against each other, as will be hereinafter more fully described. The object of this arrangement is to produce a larger percentage of friction and to enhance the value of the cog-gearing by making them stronger and more durable.

Figure 1:
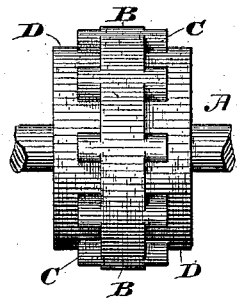
Figure 2:
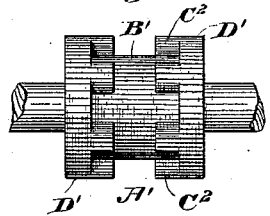
Figure 3:
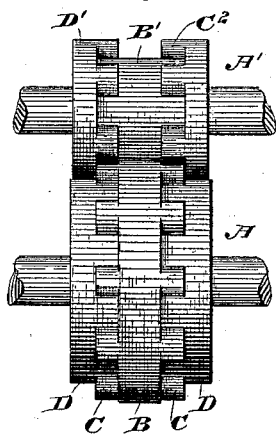

Referring to the accompanying drawings, which form a part of this specification, Figure 1 represents in elevation one of my improved friction-bearing and cog-wheels, and Fig. 2 the complementary wheel adapted to fit into it. Fig. 3 represents the same in operative position.

In the form shown I have formed on the outer periphery of the larger wheel, A, a friction-bearing surface, B, consisting of an elevated portion in the center thereof. Branching out from this elevated portion on both sides are cogs C. Beyond these cogs, and contiguous to the outer edges of the wheel, are other friction-bearing surfaces, D. The second wheel, A', is provided with complementary portions consisting of friction-surfaces and cogs with their interdental spaces. The center of this wheel B', instead of being elevated, is depressed, the outer edge, D', being, on the contrary, elevated, the cog C' proceeding inward from this elevated portion.

It will be seen from the foregoing that a friction-gearing and cog-wheels are here most advantageously combined, the cogs themselves being greatly strengthened and a larger percentage of friction obtained on the friction-bearing portions. Thus a gearing constructed on the above plan will be able to perform as heavy work as an ordinary gearing of much larger size.

I have described and illustrated a simple form of my invention; but I contemplate, when reducing it to general practice, to modify it in several ways. For instance, the friction-bearing surfaces may be changed relatively to each other and to the line of pitch— that is, they may be on the pitch-line, or they may be above or below the same, according to the amount of friction desired. Experiments have demonstrated to me the fact that not only is a gearing formed on the plan hereinbefore described stronger, but, in addition to this, it will run smoother and with less concussion and unnecessary wear and tear upon the pitch-surfaces.

Having thus described my invention, what I claim as new therein, and desire to secure by Letters Patent, is—

The combination of a wheel having a smooth bearing-surface in the center of its periphery, with teeth projecting from each side thereof, said bearing-surface and teeth being formed in rilievo out of the body of the wheel, and a second wheel having complementary portions, as described.

NOAH W. SPEERS, SR.

Witnesses:
E. S. RODGERS,
S. H. RODGERS.